US012752688B2

(12) United States Patent
Lee et al.

(10) Patent No.: US 12,752,688 B2
(45) Date of Patent: Oct. 6, 2026

(54) ARTICULATING BRIDGE TABLES FOR CONNECTING FRONT CENTER CONSOLES WITH REAR SEAT ARMRESTS OF MOTOR VEHICLES

(71) Applicant: GM GLOBAL TECHNOLOGY OPERATIONS LLC, Detroit, MI (US)

(72) Inventors: Minsu Lee, Gyeonggi-do (KR); Jongsuk An, Seo-gu (KR); Minho Ko, Bucheon-si (KR)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 18/585,171

(22) Filed: Feb. 23, 2024

(65) Prior Publication Data

US 2025/0269777 A1 Aug. 28, 2025

(51) Int. Cl.
*B60N 2/75* (2018.01)
*B60N 3/00* (2006.01)
*B60R 11/00* (2006.01)

(52) U.S. Cl.
CPC ............... *B60N 2/79* (2018.02); *B60N 2/767* (2018.02); *B60N 2/793* (2018.02); *B60N 3/001* (2013.01); *B60N 3/002* (2013.01); *B60R 2011/0007* (2013.01)

(58) Field of Classification Search
CPC ........ B60N 3/001; B60N 3/002; B60N 3/004; B60N 2/793; E05B 83/32; B60R 7/04; B60R 2011/0007
USPC ....................................................... 296/24.34
See application file for complete search history.

(56) References Cited

U.S. PATENT DOCUMENTS

| | | | | |
|---|---|---|---|---|
| 6,032,587 | A * | 3/2000 | Salenbauch ............ | B60N 3/002 108/44 |
| 7,255,402 | B1 | 8/2007 | Haddad et al. | |
| 7,828,388 | B2 | 11/2010 | Thomas | |
| 8,485,581 | B2 | 7/2013 | McKnight et al. | |
| 8,540,297 | B2 | 9/2013 | Browne et al. | |
| 9,096,177 | B2 | 8/2015 | Boundy et al. | |

(Continued)

FOREIGN PATENT DOCUMENTS

| | | | | |
|---|---|---|---|---|
| CN | 208585121 U * | 3/2019 | ............. | B60N 3/002 |
| CN | 109305079 B * | 9/2023 | ............... | B60N 2/79 |

(Continued)

*Primary Examiner* — Jason S Morrow
(74) *Attorney, Agent, or Firm* — Quinn IP Law

(57) ABSTRACT

Presented are articulating bridge tables for connecting rear seat armrests with front center consoles, methods for making/using such armrest tables, and vehicles equipped with such armrest tables. An armrest assembly includes an armrest base that mounts inside a vehicle passenger compartment adjacent a vehicle seat and longitudinally aligned with an armrest console. An armrest lid is rotatably mounted at one end thereof to one end of the armrest base to rotate between a first position, whereat the armrest lid covers the base cavity, and a second position, whereat the armrest lid exposes the base cavity. A bridge table is rotatably mounted at one end thereof to another end of the armrest base to rotate between a first position, whereat the bridge table is sandwiched between the armrest base and lid, and a second position, whereat the bridge table projects substantially horizontally from the armrest base and abuts the armrest console.

20 Claims, 2 Drawing Sheets

(56) References Cited

U.S. PATENT DOCUMENTS

| | | | | | |
|---|---|---|---|---|---|
| 10,086,732 | B2 | | 10/2018 | Welch et al. | |
| 10,137,991 | B2 | | 11/2018 | Darbyshire et al. | |
| 12,370,934 | B2 | * | 7/2025 | Nakamura | B60N 3/101 |
| 2003/0155787 | A1 | * | 8/2003 | Lein | B60N 2/793 296/24.34 |
| 2007/0205642 | A1 | * | 9/2007 | Bejin | B60N 2/793 297/188.14 |
| 2011/0109114 | A1 | | 5/2011 | Kolpasky et al. | |
| 2013/0070171 | A1 | | 3/2013 | Boyer, Jr. | |
| 2016/0272120 | A1 | * | 9/2016 | Johnston | B60N 3/102 |
| 2017/0246973 | A1 | | 8/2017 | Farooq et al. | |
| 2023/0125485 | A1 | | 4/2023 | Nakamura | |
| 2024/0157879 | A1 | * | 5/2024 | Kling | B60R 7/04 |
| 2025/0296512 | A1 | * | 9/2025 | Doll | B60N 3/10 |

FOREIGN PATENT DOCUMENTS

| | | | | | |
|---|---|---|---|---|---|
| DE | 102005048144 | A1 | * | 4/2007 | B60N 2/79 |
| DE | 202014103266 | U1 | * | 8/2014 | B60N 2/753 |
| DE | 102014002827 | A1 | * | 9/2015 | B60N 2/753 |
| DE | 102017211229 | A1 | * | 1/2019 | B60N 3/001 |
| GB | 2412848 | A | * | 10/2005 | B60R 11/0252 |
| JP | H02208139 | A | | 8/1990 | |
| JP | H0712180 | A | | 1/1995 | |
| KR | 20240050803 | A | * | 4/2024 | B60N 3/001 |

* cited by examiner

ARTICULATING BRIDGE TABLES FOR CONNECTING FRONT CENTER CONSOLES WITH REAR SEAT ARMRESTS OF MOTOR VEHICLES

INTRODUCTION

The present disclosure relates generally to armrest assemblies for motor vehicles. More specifically, aspects of this disclosure relate to passenger compartment armrest assemblies with stowable tables for occupants of automobiles.

Current production motor vehicles, such as the modern-day automobile, are originally equipped with front driver-side and front passenger-side seat assemblies and—depending on vehicle size and trim package—one or more rows of rear seat assemblies for comfortably seating occupants inside the vehicle's passenger compartment. To provide arm support for the driver and passengers, a door-side armrest may protrude inward from the interior surface of each vehicle door and may be integrated with a door latch release lever and a pull cup or handle used to open and close the door assembly. Inboard-side arm support may be provided by seatback-mounted pivotable armrests (e.g., for bucket seats), a stowable rear armrest located in a center seat backrest (e.g., for bench seats), a center console armrest buttressed on the center tunnel floor pan (e.g., for front-row seats), or a floor console armrest replacing the rear center seat (e.g., for rear split-bench seats).

Some high-end luxury automobiles, minivans, and sport utility vehicles (SUV) provide occupants with tray tables that are disposed on a top surface of the rear floor console or the back face of the stowable rear armrest. These tray tables provide passengers of the vehicle with a worksurface for placing a laptop computer, smartphone, food, drinks, or other personal items. In addition to providing a convenient work surface, rear armrests may provide other functionalities, such as storage compartments, cupholders, electrical charging plugs, data interface ports, climate control buttons, etc. Many existing tray table designs, however, may provide an inadequate total work surface area due to limited available packing space and limitations on surface topology of the rear armrest. Permanently fixtured tray table designs may also be undesirable since many occupants might find them uncomfortable for resting their hands and forearms. Likewise, cantilevered tray table designs that extend across a vehicle occupant's lap may provide insufficient stability and may also hinder that occupant's ability to enter and alight from the vehicle.

SUMMARY

Presented below are articulating bridge tables for connecting rear seat armrests with front center consoles, methods for manufacturing and methods for using such armrest assemblies, and motor vehicles equipped with such armrest assemblies. By way of illustration, and not limitation, a floor console armrest assembly is located between neighboring rear vehicle seats and longitudinally aligned along a center plane of the vehicle body with a front center console assembly. The armrest assembly includes a main armrest body that mounts onto a center tunnel floor pan, projecting vertically upward therefrom. An armrest lid is rotatably mounted at a rearward end thereof, e.g., via a leaf hinge, piano hinge, articulating hinge, etc. to a rearward end of the top face of the main armrest body. Sandwiched between the armrest lid and armrest body is a bridge table that is rotatably mounted at a forward end thereof, e.g., via a leaf hinge, piano hinge, articulating hinge, etc. to a forward end of the top face of the main armrest body. When desired, an occupant may manually rotate the armrest lift aftward from a generally horizontal position, whereat the lid covers the bridge table, to a generally vertical position, whereat the lid is generally orthogonal to the bridge table. At this juncture, the occupant may manually rotate the bridge table approximately 180 degrees from a stowed position, whereat the lid is seated on top of the armrest base, to a deployed position, whereat the table extends between and structurally connects the rear armrest assembly to the front center console.

Aspects of this disclosure are directed to articulating bridge tables that extend between and connect rear seat armrests with front center consoles. In an example, an armrest assembly is presented for a vehicle, which has a passenger compartment that contains a first (front or rear) vehicle seat, a second (rear or front) vehicle seat in tandem with the first vehicle seat, and a vehicle (front or rear) armrest console adjacent the first vehicle seat. The armrest assembly includes an armrest base that rigidly or rotatably mounts inside the passenger compartment, adjacent the second vehicle seat and longitudinally aligned with the armrest console. An armrest lid is rotatably mounted at a first (rear or front) end thereof to a first (rear or front) end of the armrest base to rotate back-and-forth between a first (closed) position, whereat the armrest lid covers a cavity in the top face of the base, and a second (open) position, whereat the armrest lid is displaced away from and exposes the base cavity. A bridge table is rotatably mounted at a first (front or rear) end thereof to a second (front or rear) end of the armrest base to rotate back-and-forth between a first (stowed) position, whereat the bridge table is sandwiched between the armrest base and lid, and a second (deployed) position, whereat the bridge table projects substantially horizontally from the armrest base and abuts the armrest console.

Additional aspects of this disclosure are directed to motor vehicles that contain articulating bridge tables that extend between and connect rear seat armrests with front center consoles. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, off-road and all-terrain vehicles (ATV), farm equipment, aircraft, watercraft, spacecraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, such as an electric traction motor and/or an internal combustion engine assembly, drives one or more of the road wheels to thereby propel the vehicle. Multiple vehicle seats are located inside the passenger compartment, including at least a pair of front vehicle seats forward of a pair of rear vehicle seats. A center console is interposed between the pair of front vehicle seats.

Continuing with the discussion of the foregoing example, the motor vehicle also contains a rear armrest assembly that is generally composed of an armrest base, a pop-top lid, and an articulating table. The armrest base is mounted inside the passenger compartment, located between the rear vehicle seats and longitudinally aligned with the center console. A back end of the pop-top lid is rotatably mounted to the back end of the armrest base to selectively rotate back-and-forth between a closed position, whereat the lid covers an internal cavity of the armrest base, and an open position, whereat the lid exposes the base cavity. A front end of the articulating bridge table is rotatably mounted to the front base end of the armrest base to selectively rotate back-and-forth between a stowed position, whereat the bridge table is sandwiched between the armrest base and lid, and a deployed position, whereat the bridge table projects forward and substantially horizontally from the armrest base and abuts the armrest console.

Further aspects of this disclosure are directed to manufacturing systems, workflow processes, and control logic for making or for using any of the herein described articulating bridge tables, vehicle armrest assemblies, and motor vehicles. In an example, a method is presented for assembling an armrest assembly for a vehicle having a passenger compartment containing a first vehicle seat, a second vehicle seat in tandem with the first vehicle seat, and an armrest console adjacent the first vehicle seat. This representative method includes, in any order and in any combination with any of the above and below disclosed options and features: forming an armrest base configured to mount inside the passenger compartment adjacent the second vehicle seat and longitudinally aligned with the armrest console, the armrest base having a base top with a base cavity and longitudinally opposing first and second base ends; mounting a first lid end of an armrest lid proximate the first base end of the armrest base such that the armrest lid is movable between a first lid position, whereat the armrest lid covers the base cavity, and a second lid position, whereat the armrest lid exposes the base cavity; and mounting a first table end of a bridge table proximate the second base end of the armrest base such that the bridge table is movable between a first table position, whereat the bridge table is sandwiched between the armrest base and the armrest lid, and a second table position, whereat the bridge table projects substantially horizontally from the armrest base and abuts the armrest console.

For any of the disclosed vehicles, methods, and armrest assemblies, the base cavity may be recessed downward into the top of the armrest base and, optionally, may extend the fore-aft length and lateral width of the base. In this instance, the bridge table, when in the first (stowed) position, may seat inside the base cavity such that the table is surrounded by the armrest base. When in the first (stowed) position, the bridge table may extend across and cover the base cavity such that a first (front) work surface of the bridge table is aligned substantially flush with a top surface of the armrest base. As a further option, the armrest lid, when in the first (closed) position, may sit on top of and cover the entire front work surface of the bridge table. Conversely, when in the second (open) position, the lid may be rotated at least about 80 degrees (e.g., 90°-100°) from the bridge table to thereby expose the entire front work surface. When in the second (deployed) position, the bridge table may be at least about 170 degrees (e.g., 180°-185°) from and, thus, is substantially parallel to the armrest lid when in the lid is moved back to the first (closed) position.

For any of the disclosed vehicles, methods, and armrest assemblies, the armrest console may include a console ledge that projects towards the armrest assembly. In this instance, a free end of the bridge table may buttress on the console ledge when the bridge table is in the second (deployed) position. Alternatively, a flange may project outward from the free end of the bridge table and seat on the armrest console. As a further option, a table locking mechanism may releasably lock the free end of the bridge table to the armrest console. It is also within the scope of this disclosure that the bridge table be cantilevered to the armrest base with the free end of the table floating immediately adjacent the armrest console. As another option, the bridge table may include an elongated (e.g., rectangular-shaped) table body with opposing first (front) and second (back) work surfaces. When the bridge table is in the first (stowed) position, the first (front) work surface faces upward, whereas the second (back) work surface faces upward when the bridge table is in the second (deployed) position. A "work surface" may be typified as a substantially flat and substantially rigid surface with limited or no padding. Comparatively, the armrest lid may have a padded top surface that faces upward when the armrest lid is in the closed position.

For any of the disclosed vehicles, methods, and armrest assemblies, the bridge table's elongated table body and work surface may be substantially coplanar with a top console surface of the armrest console and a top lid surface of the armrest lid when the bridge table is in the second (deployed) position and the bridge table is in the first (closed) position. As a further option, a lid locking mechanism may releasably lock the armrest lid in the first (closed) position. If desired, the armrest assembly may immovably mount inside the passenger compartment between neighboring rear (or front) vehicle seats, and the armrest console may immovably mount between neighboring front (or rear) vehicle seats.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
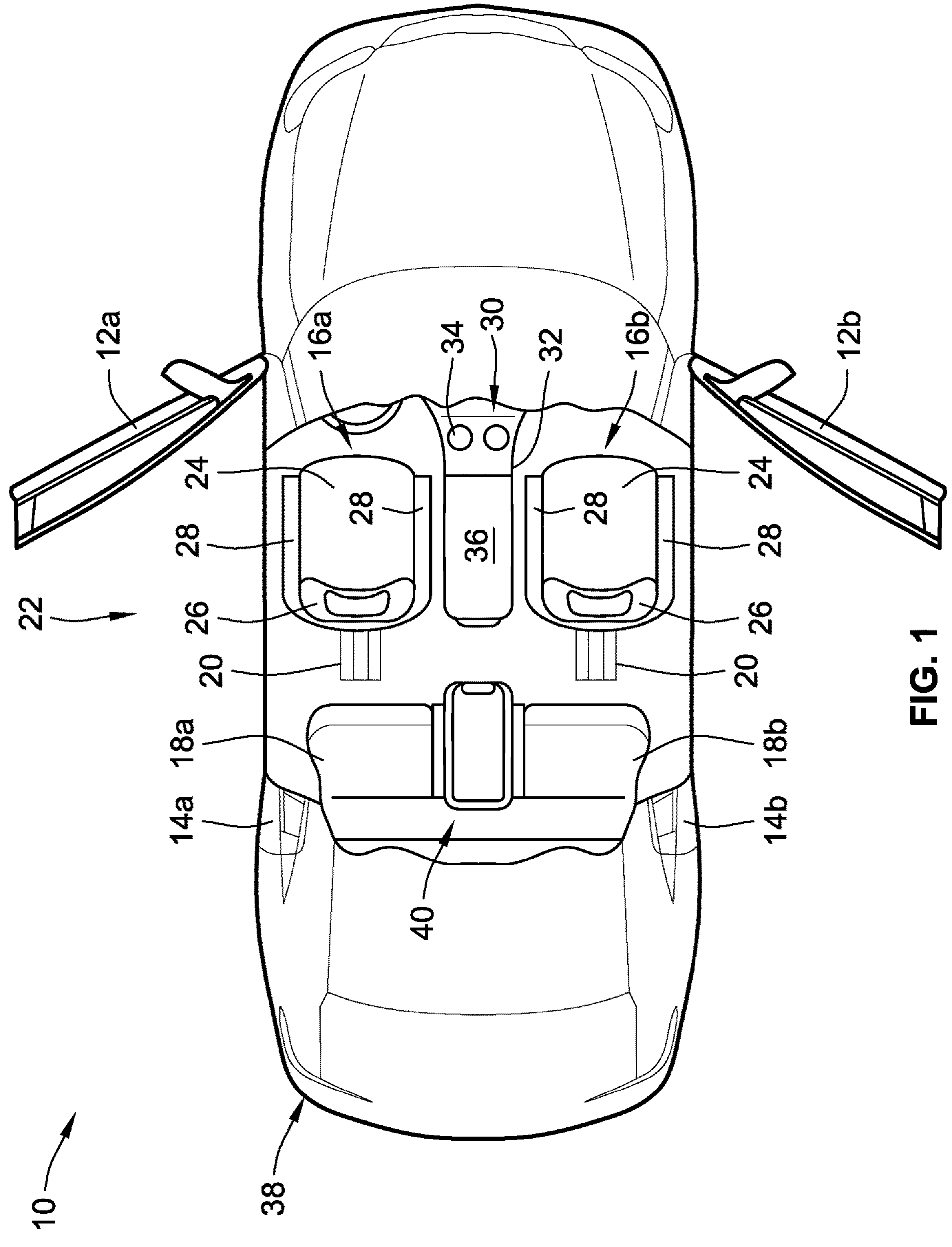
FIG. 1 is a plan-view illustration of a representative motor vehicle shown with portions of the vehicle's roof assembly and passenger doors removed to see the interior of vehicle's passenger compartment with a rear armrest assembly having an articulating bridge table in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless explicitly disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a four-door, sedan-style passenger automobile. The illustrated automobile 10—also referred to herein as "motor vehicle" or "vehicle" for short—is merely an exemplary application with which aspects of this disclosure may be practiced. In the same vein, incorporation of the present concepts into a floor-mounted rear console armrest of a second-row, split-bench passenger seat should be appreciated as a non-limiting implementation of disclosed features. As such, it will be understood that aspects and features of this disclosure may be incorporated into both front and rear armrests of varying designs, may be implemented for one, two, and three-box vehicle layouts with two or more rows of seats, and may be incorporated into any logically relevant type of vehicle. Moreover, only select components of the motor vehicle and vehicle armrest assembly are shown and described in detail herein. Nevertheless, the vehicles and armrests discussed below may include numerous additional and alternative features, and other available peripheral hardware, for carrying out the various methods and functions of this disclosure.

Automobile 10 of FIG. 1 may be described as a three-box, sedan-style passenger vehicle with two sets of vehicle doors, namely a pair of front vehicle doors 12*a* and 12*b* forward of a pair of rear vehicle doors 14*a* and 14*b*. Each vehicle door 12*a*, 12*b*, 14*a*, 14*b* is rotatably mounted with respect to a vehicle body 38 of the automobile 10 to secure close and, when desired, selectively open for providing access to a passenger compartment 22. Located inside the passenger compartment 22 are two rows of passenger seats, namely a pair of front vehicle seats 16*a* and 16*b* forward of a pair of rear vehicle seats 18*a* and 18*b*. As shown, the front driver-side and passenger-side vehicle seats 16*a*, 16*b* are bucket-style seat assemblies that may be slidably mounted onto seat tracks 20, whereas the rear driver-side and passenger-side vehicle seats 18*a*, 18*b* are a split-bench design that may be rigidly mounted in the back of the vehicle's passenger compartment 22. Each vehicle seat may include a cushioned seat bottom 24 that is either pivotably or rigidly attached to a cushioned seatback 26 via a seat frame (not visible). It should be appreciated that the automobile 10 of FIG. 1 may utilize additional rows of vehicle seats and/or different seat configurations from that which are shown in the drawings without departing from the scope of this disclosure.

Depending on vehicle make, model, and trim, the front driver-side and passenger-side vehicle seats 16*a*, 16*b* may each be equipped with a set of inboard and outboard pivotable armrests 28 for supporting the lower regions of left and right arms of the vehicle occupants. Recognizably, the pivotable armrests 28 may be altogether omitted from the automobile 10 and may be replaced or supplemented by door-integrated armrests. Interposed between the front vehicle seats 16*a*, 16*b* is a center console assembly 30, which is centrally located on the center tunnel floor pan of the vehicle body 38 and extends aftward from a forward instrument panel along the inboard flanks of the front seats 16*a*, 16*b*. The center console assembly 30 may be fabricated with a console base 32 that mounts onto the floor pan and contains one or more internal storage compartments (not visible), one or more cup holders 34, and a console work surface 36 extending along the length of the top surface of the base 32. While described hereinbelow as being incorporated into rear armrest consoles, disclosed articulating bridge table designs may instead be integrated into the forward center console assembly 30 for connecting with a rear armrest assembly.

Figure 2A:
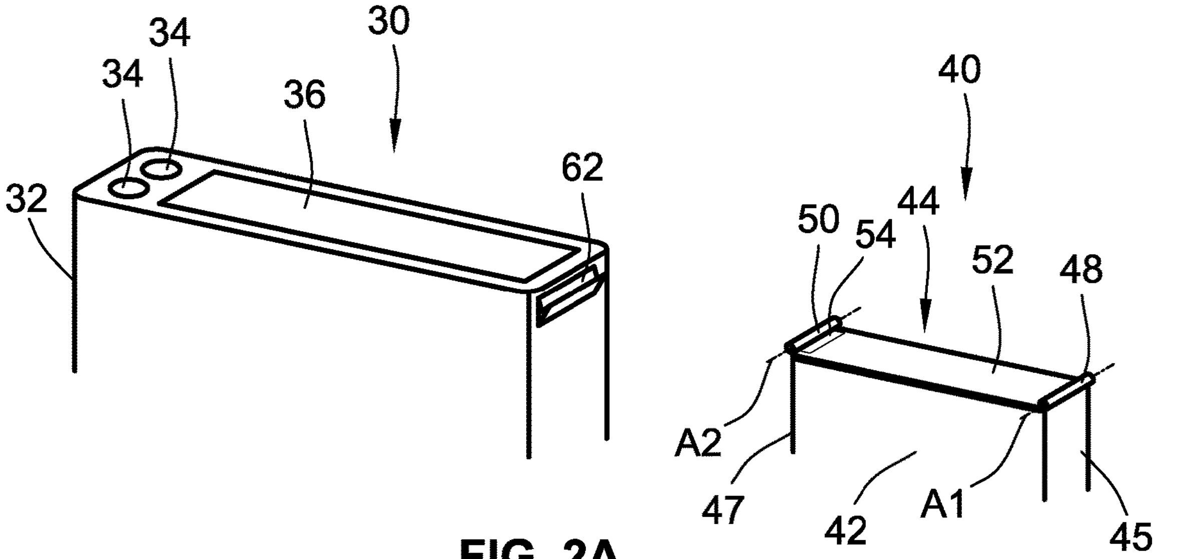
FIG. 2A-2C are perspective, side-view illustrations of a representative vehicle armrest assembly shown in a closed-lid, table-stowed state (FIG. 2A), in an opened-lid, table-stowed state (FIG. 2B), and in an opened-lid, table-deployed state (FIG. 2C) in accordance with aspects of the present disclosure.
Figure 2B:
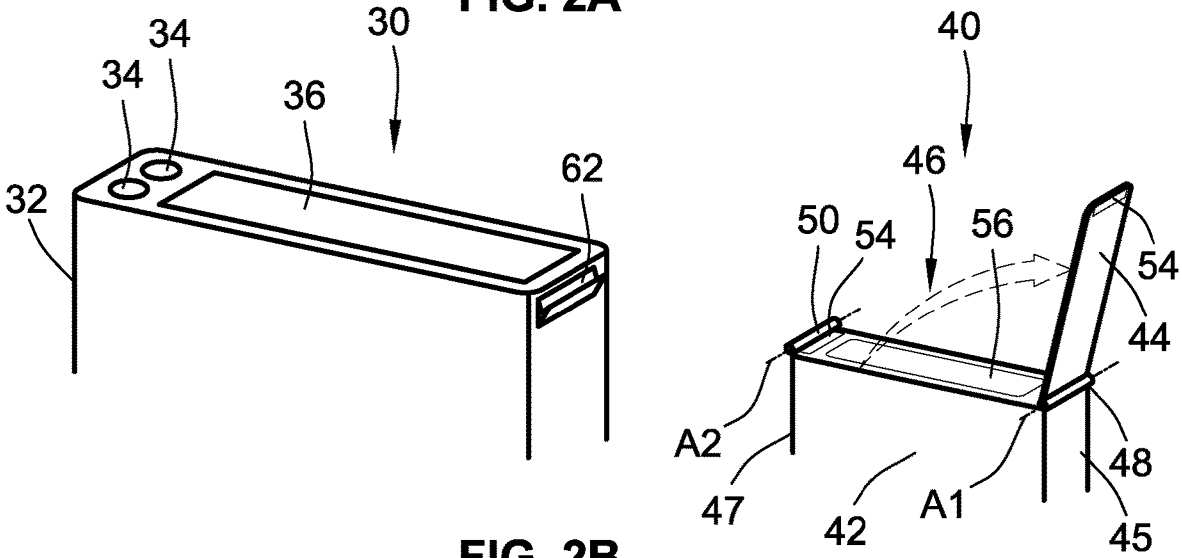
Figure 2C:
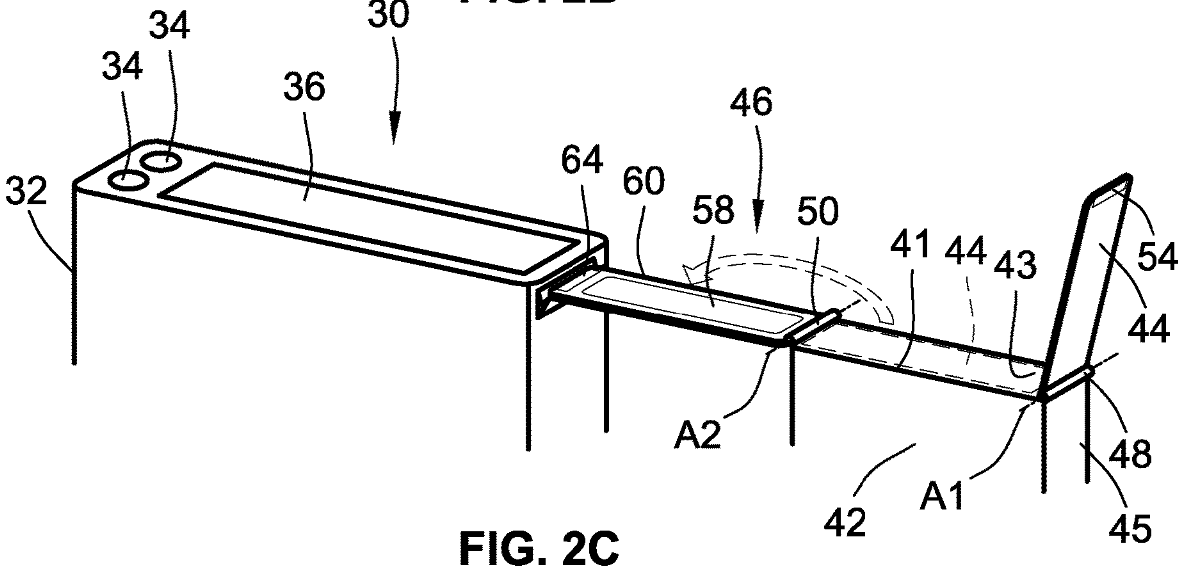

With continuing reference to FIG. 1, a rear armrest assembly 40 is located at the back of the vehicle passenger compartment 22 within the second row of vehicle seats 18*a*, 18*b*. Rear armrest assembly 40 may take on a variety of different available armrest configurations, including rotatably-mounted stowable designs, cushion-mounted universal designs, and floor-mounted console designs (as shown). In accord with the example illustrated in FIGS. 2A-2C, the rear armrest assembly 40 is generally composed of or, in some applications, consists essentially of a load-bearing armrest base 42, a pop-top armrest lid 44 (or "first lid"), and an articulating armrest bridge table 46 (or "second lid"). A bottom end of the armrest base 42 mounts, e.g., via threaded studs and mating cap nuts, inside the vehicle passenger compartment 22, interposed between the rear driver-side and passenger-side vehicle seats 18*a*, 18*b* and longitudinally aligned with the forward center console assembly 30. Located at the uppermost extent of the armrest base 42 is a base top 41 (or "top face") that circumscribes an internal cavity 43 located inside the base 42. While any logically suitable shape may be employed, the armrest base 42 of FIGS. 2A-2C is portrayed as having a right rectangular polyhedron shape with a rearward-facing (first) end 45 that is longitudinally spaced from a forward-facing (second) base end 47. As best seen in FIG. 2C, the base's internal cavity 43 is recessed downward into the base's top face 41 with an open top end of the cavity 43 facing upwards. It may be desirable that the fore-aft length of the armrest base 42 be substantially coterminous with the fore-aft length of the seat bottoms of the rear vehicle seats 18*a*, 18*b*.

To provide occupants of the rear vehicle seats 18*a*, 18*b* with a cushioned and comfortable platform for resting their forearms, the armrest lid 44 may be bolstered on the top face 41 of the base 42 to define the upper-most surface of the armrest assembly 40. FIGS. 2A and 2B illustrate a back (first) end of the armrest lid 44 rotatably mounted, e.g., via a leaf hinge, piano hinge, articulating hinge, etc. (collectively "first mounting device 48"), proximate the rearward-facing end 45 of the armrest base 42. In so doing, the armrest lid 44 may be selectively rotated, e.g., in a clockwise direction in FIGS. 2A-2C, from a closed (first) position (FIG. 2A) to an open (second) position (FIG. 2B) and, when desired, rotated back to the closed position (shown hidden at 44 in FIG. 2C). When closed, the armrest lid 44 may sit flush on the top face 41 of the base 42, extending across and covering the base cavity 43. When rotated about a first transverse axis A1 to the open position, the lid 44 is displaced from and exposes the underlying bridge table 46 and base cavity 43. It may be desirable that the armrest lid 44 be rotated at least about 80° (e.g., 90°-100°) from the bridge table 46 when moved to a fully open position.

In FIG. 2A, the armrest lid 44 is shown fabricated with a padded top surface 52 that faces upward when the lid 44 is in the closed position. It is also envisioned that the lid's top surface 52 may have a substantially flat and substantially rigid work surface that covers some or all of the lid 44. An optional lid locking mechanism 54, which may be in the nature of a push-button catch-type latch, releasably locks a front (second) end of the armrest lid 44 to the base 42 and, thus, secures the lid 44 in the closed position. While not per se required, it may be desirable that the outer periphery of the lid 44 be substantially coextensive with the outer periphery of the base top 41 and that the lid 44 mount directly to the rear end 45 of the armrest base 42. As a further option, the lid 44 may rotatably mount on a lateral side thereof to the base 42 such that the lid 44 pivots about a longitudinal axis, rather than a lateral axis, of the vehicle 10. Opening and closing of the armrest lid 44 and table 46 may be manual or automated and may be facilitated by air springs, torsional springs, linear or rotational actuators, or bidirectional electric motors.

To provide occupants of the rear vehicle seats 18*a*, 18*b* with a stable and secure work surface while traveling in the automobile 10, the articulating bridge table 46 is stowable in and selectively deployable from the armrest base 42 to thereby connect the rear armrest assembly 40 to the center console 30. FIGS. 2B and 2C illustrate a front (first) end of the bridge table 46 rotatably mounted, e.g., via a leaf hinge, piano hinge, articulating hinge, etc. (collectively "second mounting device 50"), proximate the forward-facing end 47 of the armrest base 42. In so doing, the bridge table 46 may be selectively rotated, e.g., in a counter-clockwise direction in FIGS. 2A-2C, from a stowed (first) position (FIGS. 2A and 2B) to a deployed (second) position (FIG. 2C) and, when desired, rotated back to the stowed position (FIG. 2A). When in the stowed position, the bridge table 46 is sandwiched between the armrest base 42 and lid 44, extending across and occluding the open top end of the base cavity 43. FIG. 2B shows the stowed bridge table 44 seated inside the base cavity 43 and surrounded by the armrest base 42. With the bridge table 44 stowed and the armrest lid closed, the lid 44 sits on top of, covers, and conceals the bridge table 46. When rotated about a second transverse axis A2 to the deployed position, the bridge table 42 projects substantially horizontally from the armrest base 42 and abuts a rearward end of the center console assembly 30. FIG. 2C shows the bridge table 44 displaced away from the base cavity 43 and at least partially cantilevered by the armrest base 42. As best seen in FIG. 2A, the bridge table's rotational axis A2 is substantially parallel to and longitudinally spaced from the armrest lid's rotational axis A1.

Armrest bridge table 46 may take on an assortment of shapes, sizes, and supplemental features. For instance, the bridge table 46 is shown in FIGS. 2B and 2C with an elongated and substantially flat rectangular body 60 with filleted corners, a front (first) work surface 56 on a front side of the body 60, and a back (second) work surface 58 on the opposite back side of the body 60. As used herein, the term "work surface" may be defined to include a substantially flat and substantially rigid surface with limited or no padding. It is envisioned that the table body 60 may be fabricated with recessed and raised surfaces, non-slip surface coatings and textures, anti-slip ribs and dimples, etc., and still be considered substantially flat. As a further option, the bridge table 46 may have only a single work surface 58; the front work surface 56 may be replaced with cup holders, storage pockets, wired and wireless charging interfaces, etc. In FIG. 2B, the bridge table 44 is shown stowed inside the armrest base 42 with the front work surface 56 facing upward and aligned substantially flush with a top surface of the armrest base's top face 41.

Upon moving the bridge table 46 to the deployed position and thereafter closing the armrest lid 44, it may be desirable that the bridge table 46 be at least about 170° (e.g., 180°-185°) from the armrest lid 44 such that the table 46 is substantially parallel to the lid 44 (shown hidden FIG. 2C). In FIGS. 2C, the deployed bridge table 44 is shown with the back work surface 58 facing upward and substantially coplanar (e.g., within 3-5 mm) with both a top surface of the center console 30 and a top surface of the armrest lid 42. To provide subjacent support for the unhinged "free" end of the bridge table 46, an optional console ledge 62 projects aftward from the center console 30 towards the armrest assembly 40. When the bridge table 46 is rotated to the deployed position (FIG. 2C), this free end of the table 46 is buttressed on the console ledge 62. An optional table locking mechanism 64, which may be in the nature of a spring-biased roller or bullet latch, releasably locks the unhinged "free" end of the bridge table 46 to the center console 30.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An armrest assembly for a vehicle having a passenger compartment containing a first vehicle seat, a second vehicle seat in tandem with the first vehicle seat, and an armrest console adjacent the first vehicle seat, the armrest assembly comprising:

an armrest base configured to mount inside the passenger compartment adjacent the second vehicle seat and longitudinally aligned with the armrest console, the armrest base having a base top with a base cavity and longitudinally opposing first and second base ends;

an armrest lid rotatably mounted at a first lid end thereof proximate the first base end and movable between a first lid position, whereat the armrest lid covers the base cavity, and a second lid position, whereat the armrest lid is displaced away from the base cavity; and a bridge table rotatably mounted at a first table end thereof proximate the second base end and movable between a first table position, whereat the bridge table is sandwiched between the armrest base and the armrest lid, and a second table position, whereat the bridge table projects substantially horizontally from the armrest base and abuts the armrest console.

2. The armrest assembly of claim 1, wherein the base cavity is recessed into the base top of the armrest base, and wherein the bridge table, when in the first table position, seats inside the base cavity surrounded by the armrest base.

3. The armrest assembly of claim 2, wherein the bridge table, when in the first table position, extends across and covers the base cavity with a first work surface of the bridge table aligned substantially flush with a top base surface of the base top.

4. The armrest assembly of claim 1, wherein the armrest lid, when in the first lid position, sits on top of and covers the bridge table and, when in the second lid position, is rotated at least about 80 degrees from the bridge table.

5. The armrest assembly of claim 1, wherein the bridge table, when in the second table position, is at least about 170 degrees from and substantially parallel to the armrest lid, when in the first lid position.

6. The armrest assembly of claim 1, wherein the armrest console includes a console ledge projecting towards the armrest assembly, and wherein a second table end of the bridge table is configured to buttress on the console ledge when the bridge table is in the second table position.

7. The armrest assembly of claim 6, further comprising a table locking mechanism configured to releasably lock the second table end of the bridge table to the armrest console, the table locking mechanism including a spring-biased roller latch or a bullet latch.

8. The armrest assembly of claim 1, wherein the bridge table includes an elongated table body with opposing first and second work surfaces, the first work surface facing upward when the bridge table is in the first table position and the second work surface facing upward when the bridge table is in the second table position.

9. The armrest assembly of claim 8, wherein the first and second work surfaces are substantially flat and substantially rigid surfaces sans padding.

10. The armrest assembly of claim 8, wherein the armrest lid includes a padded top surface facing upward when the armrest lid is in the first lid position.

11. The armrest assembly of claim 1, wherein the bridge table includes an elongated table body with a first work surface, the first work surface being substantially coplanar with a top console surface of the armrest console and a top lid surface of the armrest lid when the bridge table is in the second table position and the armrest lid is in the first lid position.

12. The armrest assembly of claim 1, further comprising a lid locking mechanism releasably locking the armrest lid in the first lid position.

13. The armrest assembly of claim 1, wherein the second vehicle seat includes a pair of neighboring rear vehicle seats, and wherein the armrest base is configured to immovably mount inside the passenger compartment in between the pair of neighboring rear vehicle seats.

14. A motor vehicle, comprising:

a vehicle body with a passenger compartment;

a plurality of road wheels attached to the vehicle body;

a prime mover attached to the vehicle body and configured to drive one or more of the road wheels to thereby propel the motor vehicle;

a plurality of vehicle seats located in the passenger compartment and including a pair of front vehicle seats forward of a pair of rear vehicle seats;

a center console interposed between the pair of front vehicle seats; and a rear armrest assembly, including:

an armrest base mounted inside the passenger compartment between the pair of rear vehicle seats and longitudinally aligned with the center console, the armrest base having a base top with a base cavity and longitudinally opposing front and back base ends;

an armrest lid rotatably mounted at a back lid end thereof to the back base end of the armrest base and movable between a closed lid position, whereat the armrest lid covers the base cavity, and an open lid position, whereat the armrest lid is displaced away from the base cavity; and a bridge table rotatably mounted at a front table end thereof to the front base end of the armrest base and movable between a stowed table position, whereat the bridge table is sandwiched between the armrest base and the armrest lid, and a deployed table position, whereat the bridge table projects forward and substantially horizontally from the armrest base and abuts the center console.

15. A method of assembling an armrest assembly for a vehicle having a passenger compartment containing a first vehicle seat, a second vehicle seat in tandem with the first vehicle seat, and an armrest console adjacent the first vehicle seat, the method comprising:

forming an armrest base configured to mount inside the passenger compartment adjacent the second vehicle seat and longitudinally aligned with the armrest console, the armrest base having a base top with a base cavity and longitudinally opposing first and second base ends;

mounting a first lid end of an armrest lid proximate the first base end of the armrest base such that the armrest lid is movable between a first lid position, whereat the armrest lid covers the base cavity, and a second lid position, whereat the armrest lid is displaced away from the base cavity; and mounting a first table end of a bridge table proximate the second base end of the armrest base such that the bridge table is movable between a first table position, whereat the bridge table is sandwiched between the armrest base and the armrest lid, and a second table position, whereat the bridge table projects substantially horizontally from the armrest base and abuts the armrest console.

16. The method of claim 15, wherein the base cavity is recessed into the base top of the armrest base, and wherein the bridge table, when in the first table position, seats inside the base cavity surrounded by the armrest base.

17. The method of claim 15, wherein the armrest lid, when in the first lid position, sits on top of and covers the bridge table and, when in the second lid position, is rotated at least about 80 degrees from the bridge table.

18. The method of claim 15, wherein the bridge table, when in the second table position, is rotated at least about 170 degrees from and is substantially parallel to the armrest lid, when in the first lid position.

19. The method of claim 15, wherein the armrest console includes a console ledge projecting towards the armrest assembly, and wherein a second table end of the bridge table is buttressed on the console ledge when the bridge table is in the second table position.

20. The method of claim 15, wherein the bridge table includes an elongated table body with a first work surface, the first work surface being substantially coplanar with a top console surface of the armrest console and a top lid surface of the armrest lid when the bridge table is in the second table position and the bridge table is in the first table position.

* * * * *